United States Patent [19]

Bosses

[11] Patent Number: 5,244,703

[45] Date of Patent: Sep. 14, 1993

[54] VACUUM CLEANER BAG

[75] Inventor: Mark Bosses, New York, N.Y.

[73] Assignee: Home Care Industries, Inc., Clifton, N.J.

[21] Appl. No.: 899,114

[22] Filed: Jun. 15, 1992

Related U.S. Application Data

[63] Continuation of Ser. No. 673,514, Mar. 22, 1991, abandoned.

[51] Int. Cl.$^5$ .................. B65D 30/04; B01D 46/00
[52] U.S. Cl. .................. 428/35.2; 428/36.1; 428/246; 428/248; 428/252; 428/284; 428/287; 428/903; 383/117; 15/347; 55/382

[56] References Cited

U.S. PATENT DOCUMENTS

| | | | |
|---|---|---|---|
| 2,813,596 | 11/1957 | Voigtman et al. | 55/382 |
| 3,498,031 | 3/1970 | Fesco | 55/368 |
| 3,535,855 | 10/1970 | Howard et al. | 55/368 |
| 4,164,400 | 8/1979 | Wald | 55/382 |
| 4,257,791 | 3/1981 | Wald | 55/382 |
| 4,350,727 | 9/1982 | Wald et al. | 428/102 |
| 4,374,888 | 2/1983 | Bornslaeger | 428/284 |
| 4,397,907 | 8/1983 | Rosser et al. | 428/240 |
| 4,522,876 | 6/1985 | Hiers | 428/285 |
| 4,540,625 | 9/1985 | Sherwood | 428/283 |
| 4,589,894 | 5/1986 | Gin et al. | 55/274 |
| 4,713,068 | 12/1987 | Wang | 428/903 |
| 4,948,639 | 8/1990 | Brooker | 428/36.1 |
| 5,080,702 | 1/1992 | Bosses | 55/382 |

OTHER PUBLICATIONS

MacGraw-Hill Dictionary of Scientific and Technical Terms, Parker, S. Ed., 3d Ed., 1984, p. 160.

ASTM Test Standard ASTM D 3884-80, "Standard Test Method for Abrasion Resistance of Textile Fabrics . . . ", May 1980.

Brochure, "Model 8110 Automated Filter Tester" manufactured by TSI Inc. Industrial Test Instruments Group, Copyright 1990.

*Primary Examiner*—George F. Lesmes
*Assistant Examiner*—Rena L. Dye
*Attorney, Agent, or Firm*—Amster, Rothstein & Ebenstein

[57] ABSTRACT

A vacuum cleaner filter having an outer textile fabric material laminated to a non-woven composite material. The composite material comprises an inner and an outer cover layer of a spun-bonded, non-woven web material, sandwiching at least one intermediate melt-blown layer.

37 Claims, 1 Drawing Sheet

VACUUM CLEANER BAG

This is a continuation of copending application(s) Ser. No. 07/673,514 filed on Mar. 22, 1991, now abandoned.

BACKGROUND OF THE INVENTION

1. Field of the Invention

This invention relates to a reusable vacuum cleaner filter bag having an outer knitted textile fabric material laminated to a non-woven composite material.

2. Description of the Prior Art

A variety of vacuum cleaner filters utilizing non-woven components are known. For example, U.S. Pat. No. 2,813,596 discloses a disposable vacuum cleaner dust container that has a strong, porous wrapper of sheet material able to filter dust particles from an air stream and a liner that includes plies of creped, cellulosic wadding.

U.S. Pat. No. 3,498,031 relates to a vacuum cleaner bag containing a reinforcing and auxiliary filter insert of felt-like material and U.S. Pat. No. 4,540,625 is concerned with a flexible composite useful in fabricating filters and having a fiber mass of a randomly oriented mixture of non-woven substrate fibers and organic polymer fibers intertwined therewith and containing solid sorptive microscopic particles disposed against the non-woven fibers to form a flexible, air permeable, absorbent fiber filter. Other examples of filters using non-woven components will be found in U.S. Pat. Nos. 3,535,855, 4,257,791 which is a division of U.S. Pat. No. 4,164,400, 4,397,907 and 4,522,876.

U.S. Pat. No. 4,589,894 describes a disposable filter for a vacuum cleaner having a micro-fiber filter layer sandwiched between first and second outer support layers of highly porous fabric formed of synthetic fibers.

U.S. Pat. No. 4,350,727 describes a textile composite having a knitted fabric material bonded to a non-woven needled fabric material.

SUMMARY OF THE INVENTION

The present invention features a reusable vacuum cleaner bag which has superior filtering and air permeability characteristics.

The sheet material from which the vacuum cleaner bag of the instant invention is fabricated comprises an outer layer of a textile fabric material laminated to a sandwich of non-woven materials, wherein the sandwich comprises an inner cover layer of a spun-bonded, non-woven web material, at least one intermediate layer of melt-blown material, and an outer cover layer of a spun-bonded non-woven web material.

DESCRIPTION OF THE PREFERRED EMBODIMENT

Figure 1:
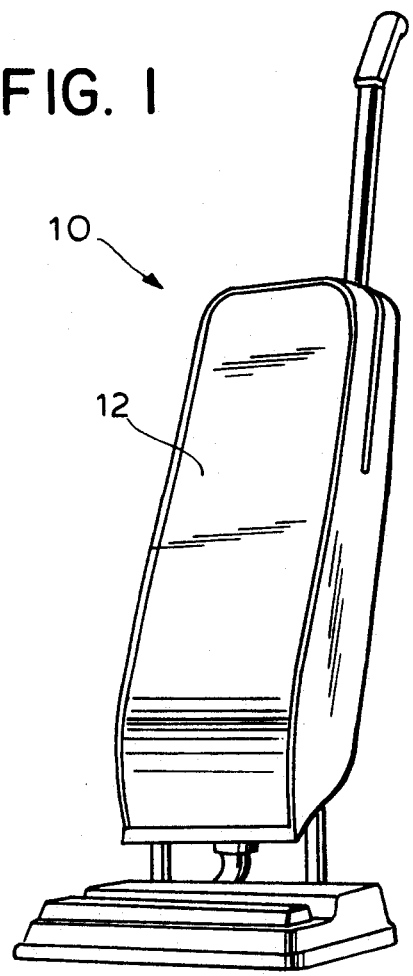
FIG. 1 depicts an upright vacuum cleaner having a reusable filter bag made in accordance with the instant invention.

Although cloth filter bags can be used in various kinds of vacuum cleaners, they are most commonly found on upright cleaners. One such cleaner 10 is depicted in FIG. 1, with the filter bag according to the instant invention being identified by the numeral 12.

Cloth filter bags are generally reusable and can be used alone or in conjunction with disposable bags. When used with a disposable bag, a cloth bag in accordance with the instant invention prevents most of the fine particles which have passed through the disposable bag from passing into the surrounding environment. When used without a disposable bag, a cloth bag in accordance with the instant invention removes not only the fine particles, but the coarser ones as well.

Figure 2:
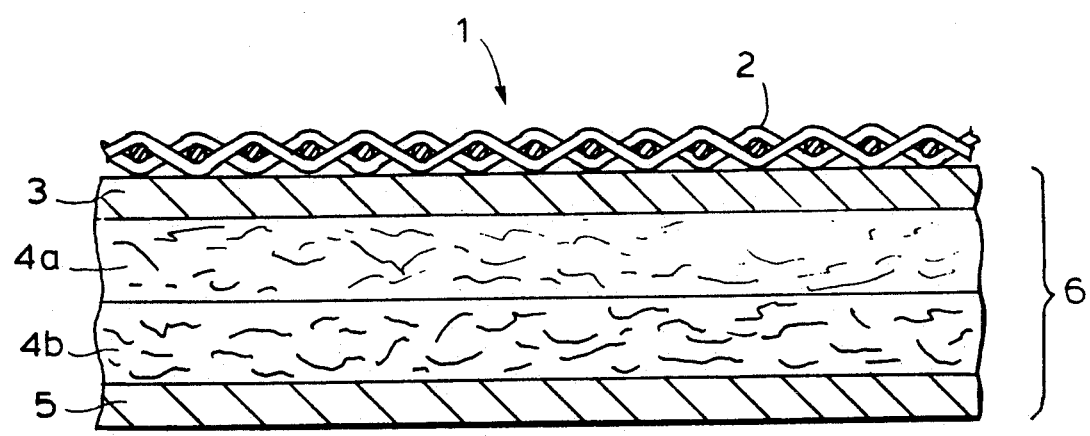
FIG. 2 is an illustration of a cross-section of the multi-layered sheet material from which the vacuum cleaner bag of the present invention is fabricated.

Referring to FIG. 2, a reusable vacuum cleaner bag according to the instant invention may be fabricated from sheet material 1 comprised of a textile fabric 2 to which there has been laminated a sandwich or composite sheet 6 of non-woven materials. The textile fabric may be made of natural fibers, e.g., wool or cotton, or of synthetic fibers, e.g., polyester, nylon, rayon, polyvinylchloride or acrylics, or some blend of natural and synthetics materials.

The textile fabric can be produced by any of the conventional knitting or weaving techniques, but should have a basis weight of between about 0.7 oz./yd.$^2$ and 7 ozs./yd.$^2$, more preferably between about 2 ozs./yd.$^2$ and 6 ozs./yd.$^2$.

The sandwich or composite material 6 comprises an inner cover layer 3 and an outer cover layer 5 of a spun-bonded, non-woven web material, preferably synthetic, and at least one, but preferably two, intermediate melt-blown layers 4a and 4b. It is believed that the most cost effective composite material 6 having the optimum performance characteristics for use in practicing the instant invention has a basis weight of between about 5 ozs./yd.$^2$ and 5.5 ozs./yd.$^2$, preferably about 5.2 ozs./yd$^2$, a grab textile strength in both the machine direction and cross direction of at least 60 lbs., preferably 80 lbs.; a trap tear strength in both the machine direction and cross direction of at least 10 lbs., preferably 20 lbs.; and a Frazier porosity or permeability of at least about 8 cfm, preferably about 17 cfm, measured at 0.5 inches H$_2$O pressure drop.

Generally, the spun-bonded layers 3 and 5 have a basis weight of from about 1 to 3 ozs./yd.$^2$ each, preferably about 2 ozs./yd.$^2$ each. The melt-blown layers 4a and 4b generally have a basis weight of from 0.25 to 2 ozs./yd.$^2$ each, preferably about 0.6 oz./yd.$^2$ each. In this regard, there is no particular reason that two layers of melt-blown materials be utilized. Rather, it is also acceptable if one layer is used, in which case the basis weight should range from about 0.5 oz./yd.$^2$ and 4 ozs./yd.$^2$, with the preferred basis weight being about 1.2 ozs./yd.$^2$. Similarly, the melt-blown component may be made of three or more layers.

The spun-bonded layer(s) are there primarily to protect the melt-blown material and to lend support. The inner spun-bonded cover layer 3 is also the substrate by which lamination to the textile fabric layer 1 is accomplished. The composite material 6 is preferably adhered to the outer knitted textile fabric 2 using a charné adhesive. The charné is a knit scrim adhesive which melts or fuses under heat and pressure. In the preferred embodiment, it is interposed at the interface between the outer knitted textile fabric and the composite material, and, upon the application of heat and pressure, the textile and non-woven components are laminated together to make the filter sheet material 1 useful in practicing the present invention.

The spun-bonded and melt-blown layers can be formed from a variety of materials, preferably, synthetic thermoplastics, including, for example, polypropylene, polyethylene terephthalene, polyethylene, polyamides, polyester, nylon, and other polymers known in the art. The preferred thermoplastic material for forming the layers is polypropylene. To facilitate bonding of the component layers of the composite material, it is believed preferable that the same polymer, e.g., polypropylene, be employed in each of the component layers. This, however, is not absolutely necessary.

The component layers of the composite material according to the present invention may be pattern bonded together. Such pattern bonding process is known in the art and is described in U.S. Pat. No. 4,374,888.

Although not believed to be necessary or even advantageous, additional component layers could be added without departing from the spirit of the instant invention. For example, an additional textile inner sheet could be laminated to spun-bonded inner layer 3 of composite sandwich sheet 6.

While the present invention has been described with respect to what is presently considered to be the preferred embodiment, it is to be understood that the invention is not limited to the specifics of the embodiment described herein. The present invention is intended to cover various and equivalent arrangements included within the spirit and scope of the appended claims.

What is claimed is:

1. A reusable vacuum cleaner bag fabricated from a multi-component sheet, said sheet comprising:
   an outermost layer of a textile fabric material laminated to a non-woven composite material, said composite material comprising:
   an inner cover layer of a spun-bonded, non-woven web;
   at least one intermediate melt-blown layer; and
   an outer cover layer of a spun-bonded, non-woven web.

2. The reusable vacuum cleaner bag according to claim 1, wherein said composite material comprises two intermediate melt-blown layers.

3. The reusable vacuum cleaner bag according to claim 1, wherein said textile fabric is comprised primarily of polyester fibers.

4. The reusable vacuum cleaner bag according to claim 1, wherein said composite material has a basis weight of between about 5 oza./yd$^2$ and 5.5 oza./yd.$^2$.

5. The reusable vacuum cleaner bag according to claim 1, wherein said spun-bonded layers and said at least one melt-blown layer are formed from a synthetic thermoplastic material.

6. The reusable vacuum cleaner bag according to claim 5, wherein said thermoplastic material is polypropylene.

7. The reusable vacuum cleaner bag according to claim 1, wherein said at least one intermediate melt-blown layer has a basis weight of between about 0.5 oz./yd.$^2$ and 4 ozs./yd.$^2$.

8. The reusable vacuum cleaner bag according to claim 2, wherein said two melt-blown layers each have a basis weight of between about 0.25 oz./yd.$^2$ and 2 ozs./yd.$^2$.

9. The reusable vacuum cleaner bag according to claim 1, wherein said composite material comprises one melt-blown layer.

10. The reusable vacuum cleaner bag according to claim 9, wherein said melt-blown layer has a basis weight of between about 0.5 oz./yd.$^2$ and 4 ozs./yd.$^2$.

11. The reusable vacuum cleaner bag according to claim 1, wherein said at least one melt-blown layer is comprised of polypropylene.

12. The reusable vacuum cleaner bag according to claim 1, wherein said inner cover layer is comprised of polypropylene.

13. The reusable vacuum cleaner bag according to claim 1, wherein said outer cover layer is comprised of polypropylene.

14. The reusable vacuum cleaner bag according to claim 1, wherein at least one of said inner cover layer and said outer cover layer is comprised of polypropylene.

15. The reusable vacuum cleaner bag according to claim 1, wherein said inner cover layer, said outer cover layer and said at least one intermediate layer are comprised of the same material.

16. The reusable vacuum cleaner bag according to claim 1, further comprising an inner textile fabric component.

17. A reusable vacuum cleaner bag fabricated from a multi-component sheet, said sheet comprising:
   an outermost layer of a textile fabric material having a basis weight of between about 0.7 oz/yd$^2$ and 7 oz/yd$^2$ and being laminated to a non-woven composite material, said composite material comprising:
   an inner cover layer of a spun-bonded, non-woven web,
   at least one intermediate melt-blown layer, and
   an outer cover layer of a spun-bonded, non-woven web.

18. A reusable vacuum cleaner bag according to claim 17, wherein said composite material comprises two intermediate melt-blown layers.

19. A reusable vacuum cleaner bag according to claim 17, wherein said textile fabric is comprised primarily of polyester fibers.

20. A reusable vacuum cleaner bag according to claim 17, wherein said textile fabric has a basis weight of between about 2 ozs./yd.$^2$ and 6 ozs./yd.$^2$.

21. A reusable vacuum cleaner bag according to claim 17, wherein said composite material has a basis weight of between about 5 ozs./yd.$^2$ and 5.5 ozs./yd.$^2$.

22. A reusable vacuum cleaner bag according to claim 21, wherein said composite material has a basis weight of about 5.2 ozs./yd.$^2$.

23. A reusable vacuum cleaner bag according to claim 17, wherein said spun-bonded layers and said at least one melt-blown layer are formed from a synthetic thermoplastic material.

24. A reusable vacuum cleaner bag according to claim 23, wherein said thermoplastic material is polypropylene.

25. A reusable vacuum cleaner bag according to claim 17, wherein said at least one intermediate melt-blown layer has a basis weight of between about 0.5 oz./yd$^2$ and 4 ozs./yd.$^2$.

26. A reusable vacuum cleaner bag according to claim 25, wherein said at least one intermediate melt-blown layer has a basis weight of about 1.2 oz./yd$^2$.

27. A reusable vacuum cleaner bag according to claim 18, wherein said two melt-blown layers each have a basis weight of between 0.25 oz./yd.$^2$ and 2 ozs./yd.$^2$.

28. A reusable vacuum cleaner bag according to claim 27, wherein said two melt-blown layers have a basis weight of about 0.6 oz./yd.$^2$ each.

29. A reusable vacuum cleaner bag according to claim 17, wherein said composite material comprises one melt-blown layer.

30. A reusable vacuum cleaner bag according to claim 29, wherein said melt-blown layer has a basis weight of between about 0.5 oz./yd.$^2$ and 4 ozs./yd.$^2$.

31. A reusable vacuum cleaner bag according to claim 30, wherein said melt-blown layer has a basis weight of about 1.2 ozs./yd.$^2$.

32. A reusable vacuum cleaner bag according to claim 17, wherein said at least one melt-blown layer is comprised of polypropylene.

33. A reusable vacuum cleaner bag according to claim 17, wherein said inner cover layer is comprised of polypropylene.

34. A reusable vacuum cleaner bag according to claim 17, wherein said outer cover layer is comprised of polypropylene.

35. A reusable vacuum cleaner bag according to claim 32, wherein at least one of said inner cover layer and said outer cover layer is comprised of polypropylene.

36. A reusable vacuum cleaner bag according to claim 17, wherein said inner cover layer, said outer cover layer and said at least one intermediate layer are comprised of the same material.

37. A reusable vacuum cleaner bag according to claim 17, further comprising an inner textile fabric component.

* * * * *